United States Patent [19]
Weisbecker

[11] 3,806,883
[45] Apr. 23, 1974

[54] LEAST RECENTLY USED LOCATION INDICATOR

[75] Inventor: Joseph A. Weisbecker, Cherry Hill, N.J.

[73] Assignee: RCA Corporation, New York, N.Y.

[22] Filed: Nov. 22, 1972

[21] Appl. No.: 308,684

[52] U.S. Cl. .............................................. 340/172.5
[51] Int. Cl. .............................................. G11c 7/00
[58] Field of Search .................................. 340/172.5

[56] References Cited

UNITED STATES PATENTS

| | | | |
|---|---|---|---|
| 3,647,348 | 3/1972 | Smith et al. | 340/172.5 |
| 3,341,817 | 9/1967 | Smeltzer | 340/172.5 |
| 3,422,401 | 1/1969 | Lucking | 340/172.5 |
| 3,351,909 | 11/1967 | Hummel | 340/172.5 |
| 3,573,750 | 4/1971 | Ishidate | 340/172.5 |

*Primary Examiner*—Gareth D. Shaw
*Attorney, Agent, or Firm*—Raymond E. Smiley; H. Christoffersen

[57] ABSTRACT

Storage registers equal in number to the number of addressable locations in an associated store of items, such as a content addressable memory, each of which holds one memory address. When a location in the store is accessed, its address is entered into the first address register and the content of all the registers up to but not including the one containing the accessed address are moved to the next register so that the registers contain a list of the order in which locations are accessed, the last register containing the address of the least recently used location.

5 Claims, 3 Drawing Figures

LEAST RECENTLY USED LOCATION INDICATOR

BACKGROUND OF THE INVENTION

Computer systems often employ a large capacity memory to store the bulk of the information (data and instructions) normally utilized in the system. A second relatively smaller capacity but much faster memory, sometimes known as a cache memory, is often also employed to store some of the most often used items of information. It is desirable to keep track of the usage of the items in the smaller memory so that an intelligent choice can be made of which item to remove from the small memory when it is full to permit a new item to be added. For example, it may be desired to remove from the small memory the item which was used the least recently of all items in the memory.

This task could be accomplished by a small software subroutine, but the subroutine takes time to execute and therefore has the effect of slowing down the high speed memory.

Another approach is to have a capacitor associated with each location, the amount of charge being determinative of the recency of usage of the memory location associated with that capacitor, such as described in U.S. Pat. No. Re. 26,624 reissued to L. Bloom et al. on July 1, 1969. This system does not practically lend itself to integrated circuitry techniques, as the capacitors cannot readily be integrated. Further, the amount of charge which is applied to a capacitor and the charge holding ability of a capacitor are not readily controllable, and this may result in errors in the selection of the items to be replaced. The point is that analog techniques of this kind inherently are less accurate than digital methods.

Other approaches featuring different algorithms than that used in the present invention are known in the prior art. For example, U.S. Pat. No. 3,573,750 issued to T. Ishidate on April 6, 1971 utilizes one or more additional bits of core storage coupled to each memory storage location for remembering how long information has been present in each location and/or how often each location has been read out. When a new word is to be added to the store, a sequential search of the additional bits is performed to determine which location to replace. This is a slow comparison process which defeats the purpose of the high speed memory, and the algorithm is not the same as one which causes the memory location used least recently to be replaced when new information has to be added to the memory.

SUMMARY OF THE INVENTION

An arrangement for indicating which of N locations was accessed least recently and for inserting new material into a location includes a storage means for storing in a list, characters which identify the N storage locations. A first means is responsive to the accessing of any location in the storage system for moving all the characters on the list above the character identifying that location down one place on the list, thereby effectively removing the character identifying that location from the list and reinserting the character identifying that location to the first place on the list. A second means for inserting new material in the storage system includes means responsive to the last character on the list for inserting the material in the location in the storage system identified by that last character.

DETAILED DESCRIPTION

Figure 1:
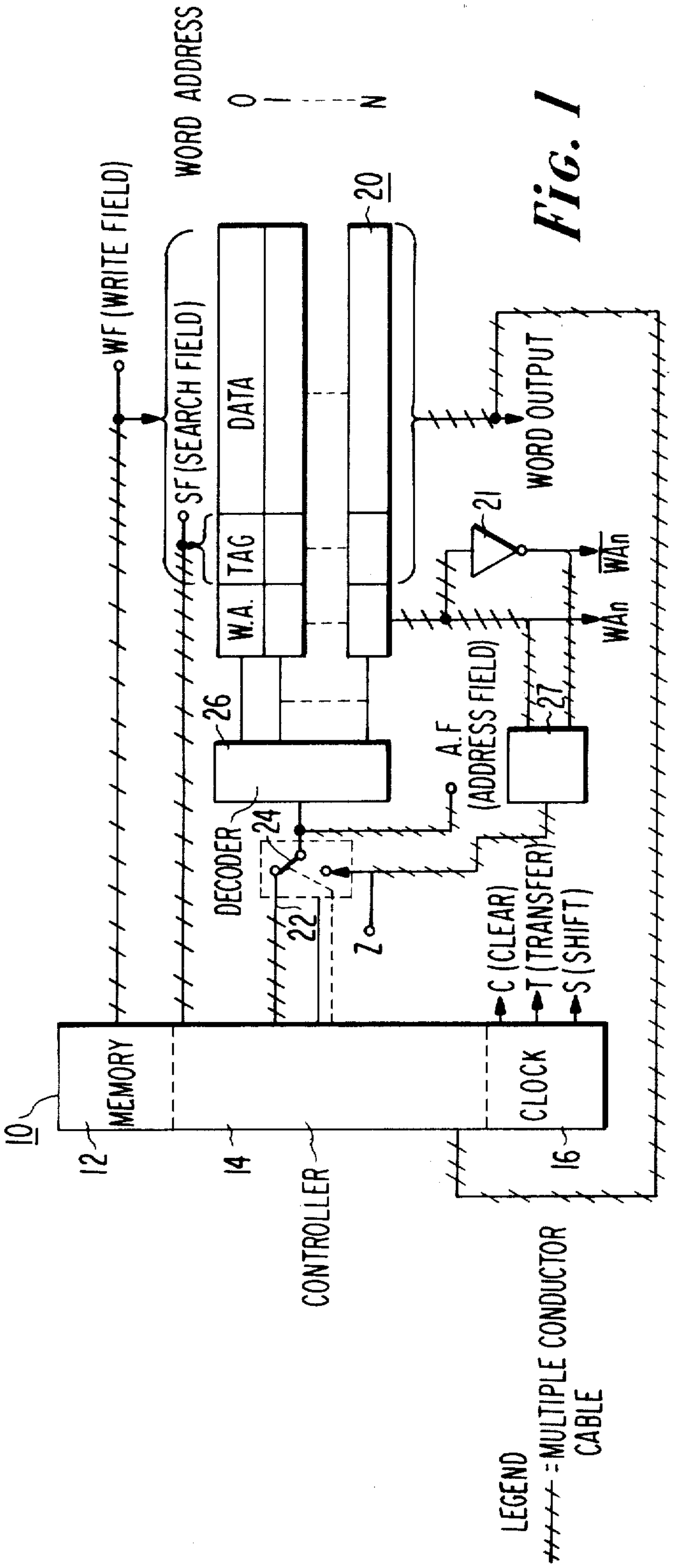
FIG. 1 is a schematic block diagram of a memory system employing the present invention.

FIG. 1 illustrates parts of interest here, of a typical general purpose computer 10. These include a memory section 12, a controller section 14, and a source of clock pulses 16. Clock pulse source 16 produces three short duration pulses labeled C (Clear), T (Transfer), and S (Shift) which occur in time sequence and are illustrated in the timing diagram of FIG. 2. Memory section 12 may represent any typical type of memory such as a core memory, a disc memory, a tape memory, a drum memory, or any combination of these or other storage systems which is capable of storing a relatively large amount of information. Alternatively, the memory 12 may in fact be a store of physical items, such as various items of an inventory in a retail or wholesale establishment. The various sections making up computer 10 are coupled to a secondary store or items or memory 20 via a multiconductor cable legended WF (Write Field). The various logic elements and other electronic circuitry necessary to transfer information from memory 12 to memory 20 are not illustrated, as they are well known in the prior art and are not part of the invention.

Memory 20 typically has a smaller capacity than memory 12 and operates at a higher speed than memory 12. Memory 20 has a plurality of storage locations having "word addresses 0, 1, . . . N." Each of the storage locations in memory 20 consists of a Word Address section (W.A.), a Tag section, and a Data section. The Word Address section consists of a number or other identification of that particular storage location; thus, for example, the word address of location 0 may be a decimal zero. The data at each storage location may be a single word of information or may be a large quantity of information sometimes referred to as a "page."

The tag portion of the storage location is a descriptor of the data which is in the data portion. For example, the tag may be an account number of an individual, and the data portion may, for example, be the name and address and perhaps the amount of money which that person has in his account. Alternatively, the tag may be an inventory control number and the data section may contain the price of the item represented by the inventory control number and may also include the quantity and other related information for the particular product.

One especially useful type of memory 20 may be a so-called content addressable memory. Such a memory is characterized by the fact that a tag of the desired piece of data generated in controller 14 may be applied to memory 20 via multiconductor cable SF (Search Field). If a corresponding tag is found in any memory 20 location, the entire tag and data portions will be read out on the output lines labeled "Word Output", while the binary address of that location appears on the WAn lines and via inverter 21 on the $\overline{\text{WAn}}$ lines where *n* represents the particular bit position of the binary number of the word address. Such a memory may also be addressed by having the controller supply the word address of a desired storage location to the multiconductor cable 22. Signals on cable 22 are fed through a two position multicontact switch 24 to a decoder 26, which decodes the address supplied on cable 22 and in response thereto causes the storage location called for by that address to be read out on the Word Output lines. Again, the address of the location being accessed appears on the WAn and $\overline{WAn}$ lines. Switch 22, while illustrated as a mechanical switch, may in reality be an electronic switch, the position of which is determined by controller 14, as indicated schematically by the dashed line connected therebetween.

It should be noted that a content addressable memory is not essential to the invention. Any memory which contains a plurality of addressable locations is satisfactory. The memory may store information in electronic form or store physical items as described in connection with the main memory 12. Further discussion, however, is limited to an electronic memory. Further, the particular method of making the word address information available on the WAn lines is unimportant. It may, for example, be stored in memory or hard wired. The only requirement is that it be made available on the $\overline{WAn}$ lines at the proper time.

In the operation of the system of FIG. 1, various items of information are written into the tag and data portions of memory 20 from memory 12 in the conventional way. Then, when it is desired to read out information from memory 20, one of two methods is utilized to choose the proper location of the information to be read from memory 20.

One method is to supply on the SF lines from controller 14 the tag bits of the particular information which is desired. As is common in content addressable memories, the tag information on the Search Field lines is compared with the tag portion of each of the locations of memory 20. When a comparison is successful at any location, that location is read out on the Word Output lines. These lines may connect to controller 14 to permit the controller to have this data processed as desired. Concurrently, the Word Address of that location is read out on the WAn lines and is inverted to appear on the $\overline{WAn}$ lines. The Word Address information is utilized in the manner discussed below in connection with FIG. 3.

The second method of choosing the location from which to read data from memory 20 is to supply the Word Address of the desired location on cable 22 through switch 24, the position of which is controlled from controller 14, to decoder 26. The latter decodes the address and causes the information contained in the appropriate location in memory 20 to be read out. Once again tag and data information appear on the Word Output lines while the word address appears on the WAn (and the $\overline{WAn}$) output lines, respectively. If the desired information is not present in memory 20, then that information must be gotten from memory 12; and since it is the most recently used information, it is loaded into memory 20.

Figure 3:
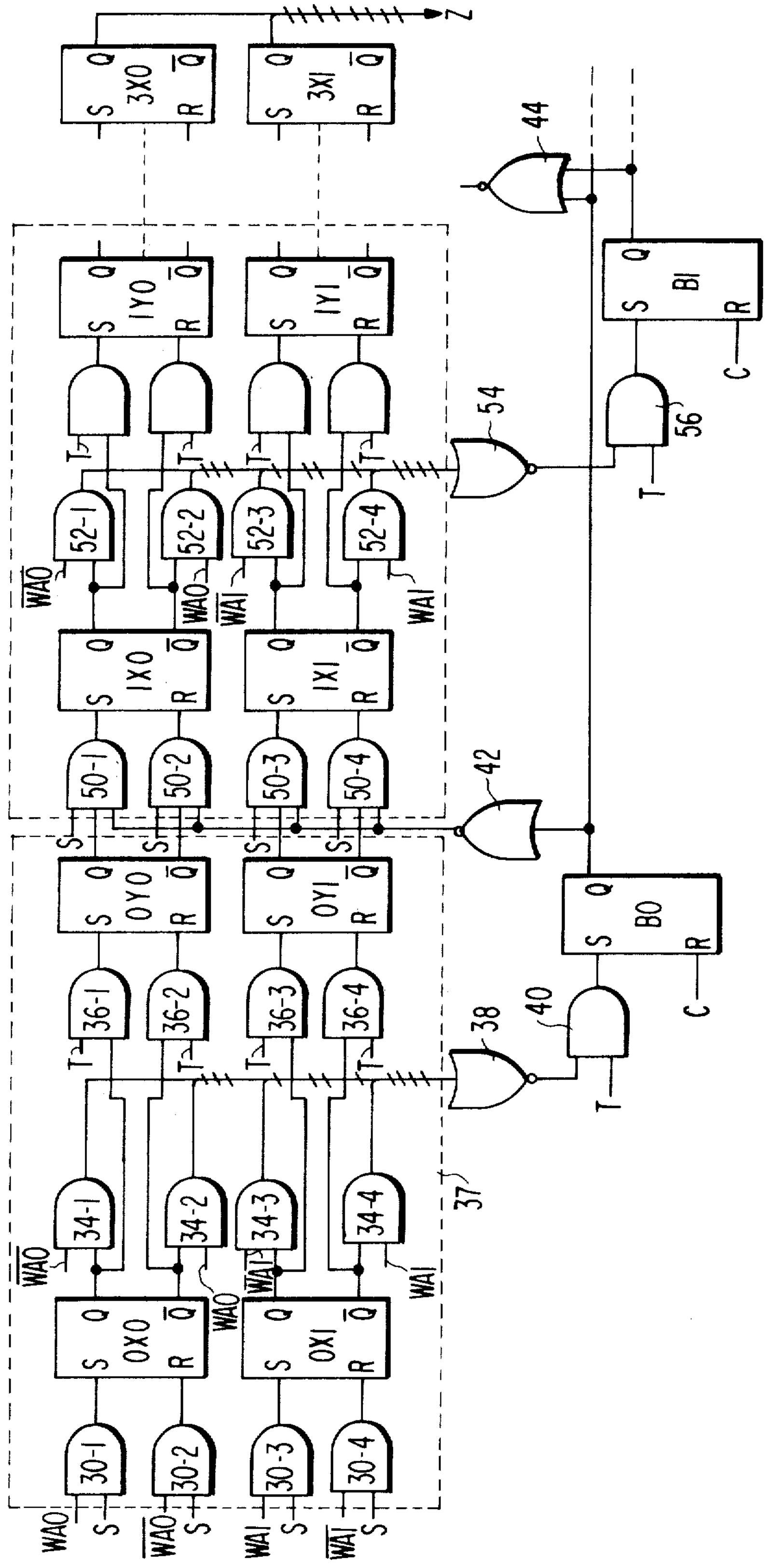
FIG. 3 is a schematic block diagram of a preferred embodiment of the present invention.

If memory 20 is full (i.e., all locations are utilized), then one of those locations must be cleared out so that the new information may be added. The rule used here is to remove the information from the least recently accessed location in memory 20. Logic circuit 27, the details of which are shown in FIG. 3, provides the means for determining which was the least recently accessed memory location. Logic circuit 27 receives the WAn and $\overline{WAn}$ signals and applies address signals via cable Z and switch 24 to decoder 26.

The least recently used location logic 27 of FIG. 3 is for a memory having only four locations, to simplify the drawing and explanation. However, as will be clear from the explanation which follows, the number of memory locations is not critical, and the principle is applicable to memories of much larger size. Each of the locations of a four word memory may be represented by a two digit binary number. Thus the W.A. portion of each location of memory 20 (FIG. 1) contains two binary digits of information. The first bit, WA0, and its complement, $\overline{WA0}$, are applied to AND gates 30–1 and 30–2, respectively, while the other bits WA1 and $\overline{WA1}$ are applied to AND gates 30–3 and 30–4, respectively. The S output of clock 16 is applied as a second input to each of gates 30. All AND gates are of the type which produce a logic 1 output signal when and only when all inputs are at a logic 1 level.

Gates 30 are coupled to a register 0X, which consists of two flip-flops 0X0 and 0X1. Flip-flops 0X0 and 0X1 and all other to be described are of conventional type, which following the receipt of a logic 1 signal at their S (set) input produce a logic 1 output at the Q terminal and a logic 0 at the $\overline{Q}$ terminal and produce the reverse output conditions following a logic 1 pulse at the R (reset) input. Specifically, gates 30–1 and 30–2 are coupled respectively to the S and R inputs of flip-flop 0X0, while gates 30–3 and 30–4 are similarly coupled to flip-flop 0X1. When, for example, the WA0 signal and S signal are both at a logic 1, gate 30–1 will be enabled and flip-flop 0X0 will be set, which means that the Q output will be at a logic 1 level and the $\overline{Q}$ output terminal will be at a logic 0 level. Note that the logic is such that a logic 1 signal cannot be applied at the same time to both the S and R terminals of a flip-flop. There is one register group for each location in memory 20. It should be noted, however, that the registers do not in any way correspond to a particular one of the memory locations.

The Q and $\overline{Q}$ output terminals of flip-flop 0X0 are coupled respectively to AND gates 34–1 and 34–2 and also to AND gates 36–1 and 36–2. Similarly, the outputs of flip-flop 0X1 are coupled to AND gates 34–3, 34–4, 36–3, and 36–4. The $\overline{WA0}$ and WA0 signals are applied to second inputs of AND gates 34–1 and 34–2, respectively. Similarly, the $\overline{WA1}$ and WA1 signals are applied to AND gates 34–3 and 34–4, respectively. The T output from clock 16 is coupled to each of AND gates 36. The outputs of AND gates 36–1 and 36–2 are applied respectively to the S and R terminals of flip-flop 0Y0 while the outputs of AND gates 36–3 and 36–4 are applied to the 0Y1 flip-flop. As will be seen shortly, these flip-flops act as termporary storage elements. The elements within dotted box 37—namely registers 0X and 0Y and gates 30, 34, and 36—form a portion of a holding means for storing an address in binary form of a location in memory 20.

The outputs of each of AND gates 34 are coupled to an inverting OR gate 38 also known as a NOR gate. The four conductors to gate 38 are illustrated by a single line crossed by short diagonal lines. An OR gate is a type of element in which a logic 1 signal at any of its inputs will cause a logic 1 signal to be emitted from its output. An inverting OR gate such as NOR gate 38 produces a logic 0 output when any of the inputs are at a logic 1 level. The output of NOR gate 38 and the T output terminal from clock 16 are coupled to the inputs of AND gate 40, the output of which is coupled to the S input of a blocking flip-flop labeled B0. The Q output on the B0 flip-flop is coupled to an OR gate 42 and to similar OR gates further along the chain for the various other register stages of the least recently used location indicator, NOR gate 44 being exemplary.

The Q and $\bar{Q}$ outputs of flip-flop 0Y0 are coupled respectively to AND gates 50–1 and 50–2 while the outputs of flip-flop 0Y1 are similarly coupled to AND gates 50–3 and 50–4, respectively. Additionally, the output of NOR gate 42 and the S output from clock 16 (FIG. 1) are coupled to additional inputs out of each of AND gates 50. The outputs of AND gates 50 are coupled to register 1X in a manner similar to that described for the coupling of AND gates 30 to register 0X. Additional interconnections of the elements need not be described as they are similar to the interconnection of the elements already described within box 37.

Each of the holding means such as 37 comprises a set of X registers and a set of Y registers interconnected by various gating means. The outputs of the various blocking flip-flops B0, B1, and others, not shown, are coupled to the AND gates serving each of the higher numbered X registers. That is, the output of blocking flip-flop B0 is coupled via OR gate 42 to the AND gates controlling the 1X registers, the 2X registers, etc. Similarly, the output of blocking flip-flop B1 is coupled to the AND gate serving the 2X register, the 3X register, etc. (These registers are not shown but are similar to those shown.) The last holding means is an exception and comprises only an X register labeled 3X0 and 3X1. There is no associated Y register since no temporary transfer from the X registers occurs. The outputs of the 3X register are labeled Z and are coupled to one side of switch means 24, FIG. 1.

The operation of the entire system is as follows. Initially it is assumed that memory 20 is erased; that is, it contains no useful information. Therefore, it would be possible to load information into any of the four locations. The X registers, FIG. 3, are then initially loaded (by means not shown) with the addresses of the various memory locations of memory 20 in any arbitrary order. That is, each register contains an address of one memory location and no two registers contain the same address. Referring for a moment to Table 1, the column labeled α shows the contents of the various X registers after the initial loading process. Thus after initialization, registers 0X contain the binary equivalent of the decimal 3, etc.

TABLE 1

| | | Cycle | | | | | | | | | | | | | |
|---|---|---|---|---|---|---|---|---|---|---|---|---|---|---|---|
| | | A | | B | | C | | D | | E | | F | | G | |
| Time | α | T | S | T | S | T | S | T | S | T | S | T | S | T | S |
| W.A. | | 0 | ---- | 1 | ---- | 2 | ---- | 1 | ---- | 3 | ---- | 2 | ---- | 0 | ---- |
| 0X | 3 | ---- | 0 | ---- | 1 | ---- | 2 | ---- | 1 | ---- | 3 | ---- | 2 | ---- | 0 |
| 0Y | | 3 | ---- | 0 | ---- | 1 | ---- | 2 | ---- | 1 | ---- | 3 | ---- | 2 | ---- |
| 1X | 2 | ---- | 3 | ---- | 0 | ---- | 1 | ---- | 2 | ---- | 1 | ---- | 3 | ---- | 2 |
| 1Y | | 2 | ---- | 3 | ---- | 0 | ---- | 1 | ---- | 2 | ---- | 1 | ---- | 3 | ---- |
| 2X | 1 | ---- | 2 | ---- | 3 | ---- | 0 | ---- | 0 | ---- | 2 | ---- | 1 | ---- | 3 |
| 2Y | | 1 | ---- | 2 | ---- | 3 | ---- | 0 | ---- | 0 | ---- | 2 | ---- | 1 | ---- |
| 3X | 0 | 0 | 1 | 1 | 2 | 2 | 3 | 3 | 3 | 3 | 0 | 0 | 0 | 0 | 1 |

After the initialization process is complete, let it be assumed that the controller wishes to read out a memory location from memory 20 corresponding to a certain tag. The tag will be transmitted on the SF lines to memory 20. In a manner common to content addressable memories and which need not be described in detail here, in response to the tag word appearing on the SF lines, a search of all memory locations is conducted for a match between that tag word and a tag word stored in memory. Since the memory is empty, no output occurs on the Word Output lines. This information is transmitted back to controller 14, which then causes the desired information to be located in main memory 12 via conventional programming techniques.

Figure 2:
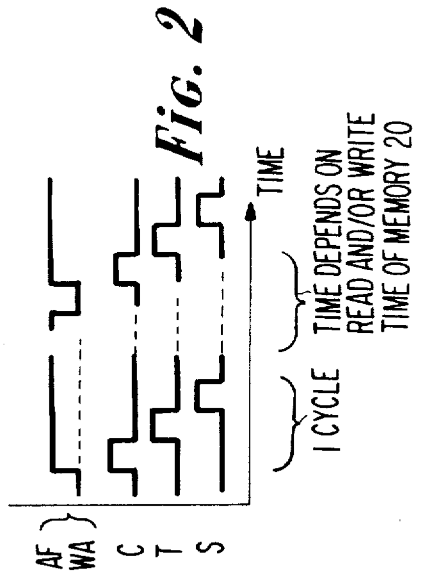
FIG. 2 is a set of waveforms useful in understanding the memory system of FIG. 1.

The desired information is then written into memory 20 via the WF lines. As mentioned previously, the actual hardware and steps involved in transferring from one memory to another are not given, as they are well known. Since memory 20 is empty, the information could be written into any location, but by definition, register 3X (the last register in the chain) contains the address of the next memory 20 location into which the information will be written. According to Table 1, Column α, the address of that location is 0. Therefore, the outputs of register 3X are coupled via switch means 24 to decoder 26 to enable location 0 in memory 20. During the time that location 0 is accessed, the number 0, in binary fashion, appears on the WAn and $\overline{\text{WAn}}$ lines. This is depicted as a relatively positive signal in the upper waveform of FIG. 2. Also during the first part of this time (denoted Cycle A in Table 1), clock 16 issues serially the C, T, and S signals as shown in FIG. 2. The time over which these signals are issued is termed a cycle. The contents of the X and Y registers is illustrated in Table 1 during and after several such cycles denoted cycle A, B, ... G.

During the first portion of cycle A, Table 1, the C pulse clears all blocking flip-flops. This is an unnecessary step in cycle A. It will, however, be found useful in other cycles to be described shortly. During the second portion of cycle A, the T pulse enables all gates coupled to the temporary Y registers so that word addresses from the X registers may be transferred to their associated Y registers. Of course, no transfer takes place from the last X register since no Y register exists. The results of this transfer are illustrated in Table 1, cycle A, under the portion labeled T, hereinafter referred to as cycle A-T. The hyphen marks in the T column for the X registers indicate that the contents of those X registers are of no importance. As a practical matter, they still contain the same information as before the occurrence of the T pulse. Also, during the T pulse time the contents of all X registers are compared with the address of the register being accessed as that information appears on the WAn lines. For example, comparison of register OX with the address occurs in gates 34. This comparison is a negative type of comparison in that if the contents of register OX and the address as it appears on the WAn lines from memory 20 do not agree, then one or more of gates 34 will be enabled, producing a logic 1. Any logic 1 at NOR gate 38 will produce a logic 0 to disable AND gate 40 when the T pulse is applied to gate 40. In the example chosen for illustration (in which word address 0 is the next available address), both AND gates 34–1 and 34–3 are enabled.

If a "match" does not occur at a particular register (characterized by one or more of its output AND gates being enabled as described above, and its associated NOR gate producing a logic 0), then the associated blocking flip-flop will not become set. In the particular example given, none of the blocking flip-flops become set. (There is no blocking flip-flop associated with register 3X, which does in fact contain a decimal 0.)

The S pulse from clock 16 which follows the T pulse causes information transfer from each temporary storage Y register to the following X register unless a blocking flip-flop is set. In the instant example, since no blocking flip-flop is set, transfer from each of the Y registers to the following X register occurs. Concurrently the address appearing on the WAn lines is gated via gates 30 into register 0X. The results of this transfer are illustrated in Table 1, cycle A-S.

If the controller searches unsuccessfully for a second word in memory 20, an action similar to that just described will occur to load that second word from main memory 12 into auxiliary memory 20 in the location having a Word Address 1, an address obtained from the Z output lines of register 3X. This action is illustrated in Table 1, cycle B. In a similar fashion, transfer of information to memory 20 location having a Word Address 2 (not illustrated) may occur as indicated by cycle C.

At the end of cycle C, as will be noted from Table 1, cycle C-S, the X registers indicate the recency of usage of the Word Addresses of memory 20; that is, the most recently accessed location is 2, the next most recently accessed location is 1, and so on. Register 3X contains the least most recently accessed locati9n 3, which in fact has never been accessed in the example given.

Now assume that during the next cycle, cycle D, a desired tag appears on the SF lines which matches a tag located in memory 20. Thereafter a C pulse is emitted by clock 16, which clears all blocking flip-flops (since none are set, this pulse has no effect). The following T pulse transfers information from all X registers into all Y registers as shown in Table 1, cycle D-T. Since register 1X contains a decimal 1 (see cycle C-S, Table 1), none of AND gates 52 will be enabled. Therefore, all logic 0's appear at NOR gate 54, which produces a logic 1. This logic 1 combines with the T pulse at AND gate 56 to enable blocking flip-flop 1. Then, during the succeeding S pulse, transfer occurs of the address of the accessed memory 20 location into register 0X and of the information of register 0Y to register 1X. Transfer of information from register 1Y to register 2X (not shown) is blocked by the set blocking flip-flop B1 and the resulting low from NOR gate 44. Also, since the blocking flip-flop is coupled to similar NOR gates associated with the other X registers (in this example, register 3X), no transfer from the preceeding 2Y register to register 3X occurs. The results are shown at cycle D-S in Table 1. That is, register 0X contains the most recently accessed memory location, 1, and register 3X contains the least recently accessed location, 3, which in fact has not yet been accessed.

Cycle E shows the results after register 3 has been accessed. Cycle F shows the results of register 2 being accessed. This may occur as a result of a match between a desired tag on the SF lines or as a result of directly accessing Word Address 2 of memory 20 via cable 22 and switch 24, set in the position shown. In any event, since register 2X contains the decimal number 2 (see cycle E-S), its associated blocking flip-flop (not shown) will be set to block the transfer of the number 2 into register 3X. Instead, the number 2 will be entered into register 0X at S time as a result of its being available on the WA lines.

Similarly, column G shows the result of an access of Word Address 0 in memory 20. Again this may be due to a comparison between a desired Tag and a Tag location at address 0, the result of directly addressing Word Address 0 from controller 14 or the result of looking without success for a word and replacing the least recently accessed storage location, the address of which is stored in register 3X.

To summarize then, following each S pulse from clock 16, the X registers contain an ordered list of recency of usage of memory 20. Register 0X contains the most recently accessed memory location, while register 3X contains the decimal number of the least recently accessed memory location or at least a memory location which is empty as a result of never having been accessed at all. The Y registers are merely temporary storage registers required in a practical system. If transfers to and from an X register and a comparison of word addresses with the contents of the X registers could occur simultaneously, then no Y registers would be necessary. Also, while the system has been described in terms of an electronic memory 20 and memory 12, the claims are not meant to be so limited. That is, memory 12 could represent a warehouse in a mail-order house full of physical items, while memory 20 could represent a store of those items which are most often in demand by customers and therefore nearest a packing station. In a store of physical items as in a logic memory, it is desired to have the most often demanded items near the packer and those which are less often required in some less readily accessible storage area.

What is claimed is:

1. An arrangement for indicating which of N locations in a storage system was accessed least recently, and for inserting new material into a location comprising, in combination:

storage means for storing in a list, characters which identify the N storage locations;

first means responsive to the accessing of any location in said storage system for moving all characters on the list above the character identifying that location down one place on the list, thereby effectively removing the character identifying that location from the list and for reinserting the character identifying that location to the first place on the list; and second means for inserting new material in said storage system comprising means responsive to the last character on said list for inserting said material in the location in the storage system identified by said last character.

2. The combination as set forth in claim 1 wherein said storage means comprise N holding means, each capable of identifying a storage location, the holding means being coupled seriatim.

3. The combination as set forth in claim 2 wherein said first means comprises means for comparing the character associated with an accessed location with the contents of said N holding means and for producing a signal indicating the holding means at which a match occurs and wherein said holding means are normally responsive to a signal indicating an access of said memory for transferring all characters to the next holding means, said match signal blocking the transfer of information into all holding means beyond the one where said match occurs.

4. Apparatus for keeping track of the order in which a compartmentalized addressable store of items is accessed, comprising, in combination:

holding means equal in number to the number of compartments in said store coupled in sequential fashion so that there is a first and last such means, each capable of storing an address of a compartment, each normally responsive to command signals for transferring an address to the next sequential means;

means coupled to said compartmentalized store for providing an address of an accessed compartment and coupled to said first holding means responsive to said command signals for entering said address therein; and means responsive to a match between an address in one of said holding means and the address produced by said means providing an address, for providing blocking signals to prevent address transfers from all storing means between the one containing said matching address and said last storing means wheh such command signals are present whereby said last holding means contains the address of the least used compartment.

5. In combination:

a memory means including a plurality of accessible address locations;

means providing address signals of an addressable location being accessed;

means for holding all the addresses of said locations and including an input portion and an output portion and normally responsive to a source of command signals for transferring said addresses in first-in-first-out fashion towards said output portion and for adding said address of said location being accessed to said input portion; and means responsive to a match between the address of an accessed location and an address in said holding means for providing blocking signals to prevent the transfer of addresses in said holding means between the portion containing said match address and said output portion, whereby said output portion contains the address of the least recently accessed memory field.

* * * * *